Figure 1:
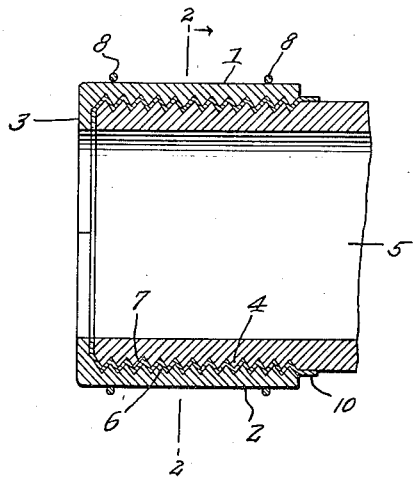

May 11, 1943.　　M. E. GOLDBERG ET AL　　2,319,124

SECTIONAL THREAD PROTECTOR

Filed July 11, 1942

Inventor
Manuel E. Goldberg
Rodger F. Haughey

By Clarence A. O'Brien
and Harvey B. Jacobson
Attorneys

Patented May 11, 1943

2,319,124

UNITED STATES PATENT OFFICE 2,319,124

SECTIONAL THREAD PROTECTOR

Manuel E. Goldberg and Rodger F. Haughey, McKeesport, Pa.

Application July 11, 1942, Serial No. 450,586

2 Claims. (Cl. 138—96)

Our invention relates to improvements in thread protectors for pipe and the like, the principal object in view being to provide a simply constructed, inexpensive and efficient device for protecting the threads of pipe while in transit, or storage, against being damaged by moisture, dirt, impact with other pipe, and in fact from any causes, and which may be applied and removed easily and quickly.

Other and subordinate objects are also comprehended by our invention, all of which, together with the precise nature of our improvements, will be readily understood when the succeeding description and claims are read with reference to the drawing accompanying and forming part of this specification.

Figure 2:
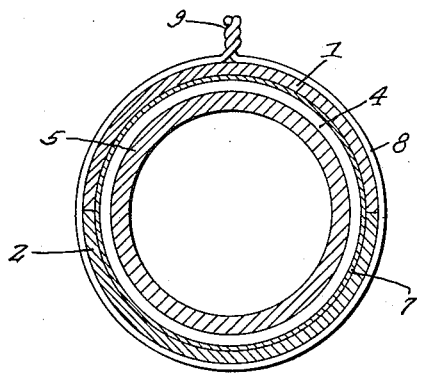
Figure 3:
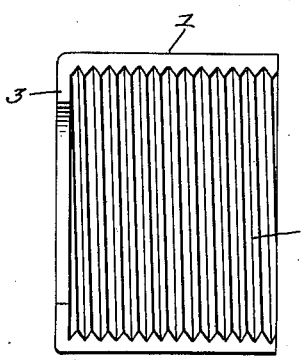

In said drawing:

Figure 1 is a view in longitudinal section illustrating our invention in its preferred embodiment applied to a portion of a pipe section, Figure 2 is a view in transverse section, taken on the line 2—2 of Figure 1, and Figure 3 is a view in side elevation of one of the cap sections.

Referring to the drawing by numerals, our improved protector, as illustrated, comprises a pair of semi-cylindrical, internally threaded cap sections 1, 2 of any suitable size, according to the number and diameters of the threads to be protected, said sections each having an inturned outer end flange 3 and being designed to fit together in edge-to-edge mating relation around the threads 4 of a pipe section 5, or the like, with a slight clearance between the threads 6 of the sections and the threads 4 of the pipe section 5. The sections 1, 2 may be tapered internally to fit tapering threads if desired and may be formed of any suitable light, strong material.

Between the cap sections 1, 2 is a layer of flexible, moisture proof, sealing material 7, such as Scotch tape, which may be applied over the threads 4 of the pipe section 5 and between the flanges 3 and the end of said pipe section 5 in any suitable manner.

The cap sections 1, 2 are secured together and clamped against the sealing material 7 to form a cylindrical cap with the threads 6 of the sections 1, 2 fitting in between the threads 4 of the pipe section 5 and forcing the sealing material into said threads 4 and against the end of the pipe section 5, and preferably by means of wire looped, as at 8, around the sections 1, 2 adjacent the ends thereof with the ends of the loops twisted together, as at 9. Preferably the sealing material 7 is imposed on the pipe section 5 to lap over said section beyond the sections 1, 2 as shown at 10.

As will now be seen, by virtue of the described cap sections 1, 2 and sealing material 7, the threads 4 are fully enclosed in a manner such that they will be maintained dry and protected against impact thereagainst, and the sections 1, 2 may be easily and quickly applied in a manner such as to preclude accidental displacement thereof. To remove the described protector, it is merely necessary to cut the loops 8, detach the same and tear off the sealing material 7. The cap sections 1, 2 are interchangeable with others of the same size, which is an added advantage, as will be obvious.

The sections 1, 2 may be stamped out in corrugated form and therefore produced quickly and inexpensively.

The foregoing will, it is thought, suffice to impart a clear understanding of our invention without further explanation.

Manifestly, the invention, as described, is susceptible of modification without departing from the inventive concept, and right is herein reserved to such modifications as fall within the scope of the subjoined claims.

What we claim is:

1. A protector for the threads of a pipe section comprising a pair of semi-cylindrical internally threaded cap sections fitting together around said threads in opposed edge-to-edge mating relation and having an end flange respectively to be opposed to the end of the pipe, and means to secure said sections together comprising a length of wire looped around the sections with its ends twisted into interlocking relation.

2. A protector for the threads of a pipe section comprising a pair of semi-cylindrical internally threaded cap sections fitting together around said threads in opposed edge-to-edge mating relation and having an end flange respectively to be opposed to the end of the pipe, means to secure said sections together comprising lengths of wire looped around the sections with their ends twisted into interlocking relation, and a liner of flexible moisture proof material for said sections.

MANUEL E. GOLDBERG.
RODGER F. HAUGHEY.